(12) United States Patent
Katagiri

(10) Patent No.: US 8,405,031 B2
(45) Date of Patent: Mar. 26, 2013

(54) TERAHERTZ WAVE GENERATOR

(75) Inventor: Takashi Katagiri, Sendai (JP)

(73) Assignee: Canon Kabushiki Kaisha, Tokyo (JP)

( * ) Notice: Subject to any disclaimer, the term of this patent is extended or adjusted under 35 U.S.C. 154(b) by 843 days.

(21) Appl. No.: 12/570,791

(22) Filed: Sep. 30, 2009

(65) Prior Publication Data

US 2010/0084570 A1     Apr. 8, 2010

(30) Foreign Application Priority Data

Oct. 8, 2008 (JP) ................................. 2008-261747

(51) Int. Cl.
*G01T 1/161* (2006.01)
(52) U.S. Cl. .................. 250/338.4; 250/458.1; 250/250
(58) Field of Classification Search ................ 250/458.1
See application file for complete search history.

(56) References Cited

U.S. PATENT DOCUMENTS

| | | | | |
|---|---|---|---|---|
| 3,983,406 A * | 9/1976 | Lax et al. | ...................... | 359/326 |
| 5,167,000 A * | 11/1992 | Minemoto et al. | ............ | 385/122 |
| 5,274,495 A * | 12/1993 | Shirasaki | ...................... | 359/330 |
| 5,305,345 A * | 4/1994 | Albrecht et al. | ................ | 372/69 |
| 5,640,480 A * | 6/1997 | Komine | ........................ | 385/122 |
| 5,684,913 A * | 11/1997 | Sugiyama et al. | ............ | 385/143 |
| 6,448,850 B1 * | 9/2002 | Yamada | .......................... | 330/44 |
| 6,697,186 B2 * | 2/2004 | Kawase et al. | ................ | 359/330 |
| 7,426,075 B2 * | 9/2008 | Haidar et al. | .................. | 359/326 |
| 7,430,074 B2 * | 9/2008 | Korenblit et al. | ............. | 359/342 |
| 7,601,977 B2 * | 10/2009 | Yeh et al. | .................. | 250/504 R |
| 7,723,708 B2 * | 5/2010 | Ouchi et al. | ................ | 250/493.1 |
| 7,764,422 B2 * | 7/2010 | Ichikawa | ...................... | 359/330 |
| 7,768,696 B2 * | 8/2010 | Higuma et al. | ................ | 359/333 |
| 2002/0171913 A1 * | 11/2002 | Batchko et al. | ................ | 359/333 |
| 2003/0016722 A1 * | 1/2003 | Zimmerman | .................. | 372/103 |
| 2005/0242287 A1 * | 11/2005 | Hakimi | ..................... | 250/363.09 |
| 2005/0281508 A1 * | 12/2005 | Krupkin et al. | .................. | 385/36 |
| 2006/0238854 A1 * | 10/2006 | Haidar et al. | .................. | 359/326 |
| 2008/0217538 A1 * | 9/2008 | Ouchi et al. | .................. | 250/338.4 |
| 2008/0265165 A1 * | 10/2008 | Yeh et al. | .................... | 250/341.1 |
| 2009/0135857 A1 * | 5/2009 | Oh et al. | ........................... | 372/4 |
| 2009/0146084 A1 * | 6/2009 | Itsuji | .......................... | 250/503.1 |
| 2010/0054296 A1 * | 3/2010 | Ohtake et al. | ................... | 372/80 |
| 2010/0084570 A1 * | 4/2010 | Katagiri | ..................... | 250/458.1 |

OTHER PUBLICATIONS

L. Xu et al., "Terahertz Radiation from Large Aperture Si p-i-n Diodes", *Appl. Phys. Letters*, vol. 59, No. 26, p. 3357-59 (Dec. 23, 1991).

A. Malcoci et al., "Optical THz Generation", *Proc. of Int'l Topical Meeting on Microwave Photonics*, p. 179-82 (Sep. 10-12, 2003).

* cited by examiner

*Primary Examiner* — David Porta
*Assistant Examiner* — Djura Malevic
(74) *Attorney, Agent, or Firm* — Fitzpatrick, Cella, Harper & Scinto

(57) ABSTRACT

Provided is a terahertz wave generator that improves efficiency of generating a terahertz wave. The terahertz wave generator includes a generating layer for generating the terahertz wave, a waveguide layer for propagating excitation light entering the generating layer and a terahertz wave generated by the excitation light entering the generating layer, and a first confinement layer for confining in the waveguide layer the excitation light propagating in the waveguide layer and the terahertz wave propagating in the waveguide layer. The generating layer, the waveguide layer, and the first confinement layer are laminated in the stated order.

19 Claims, 9 Drawing Sheets

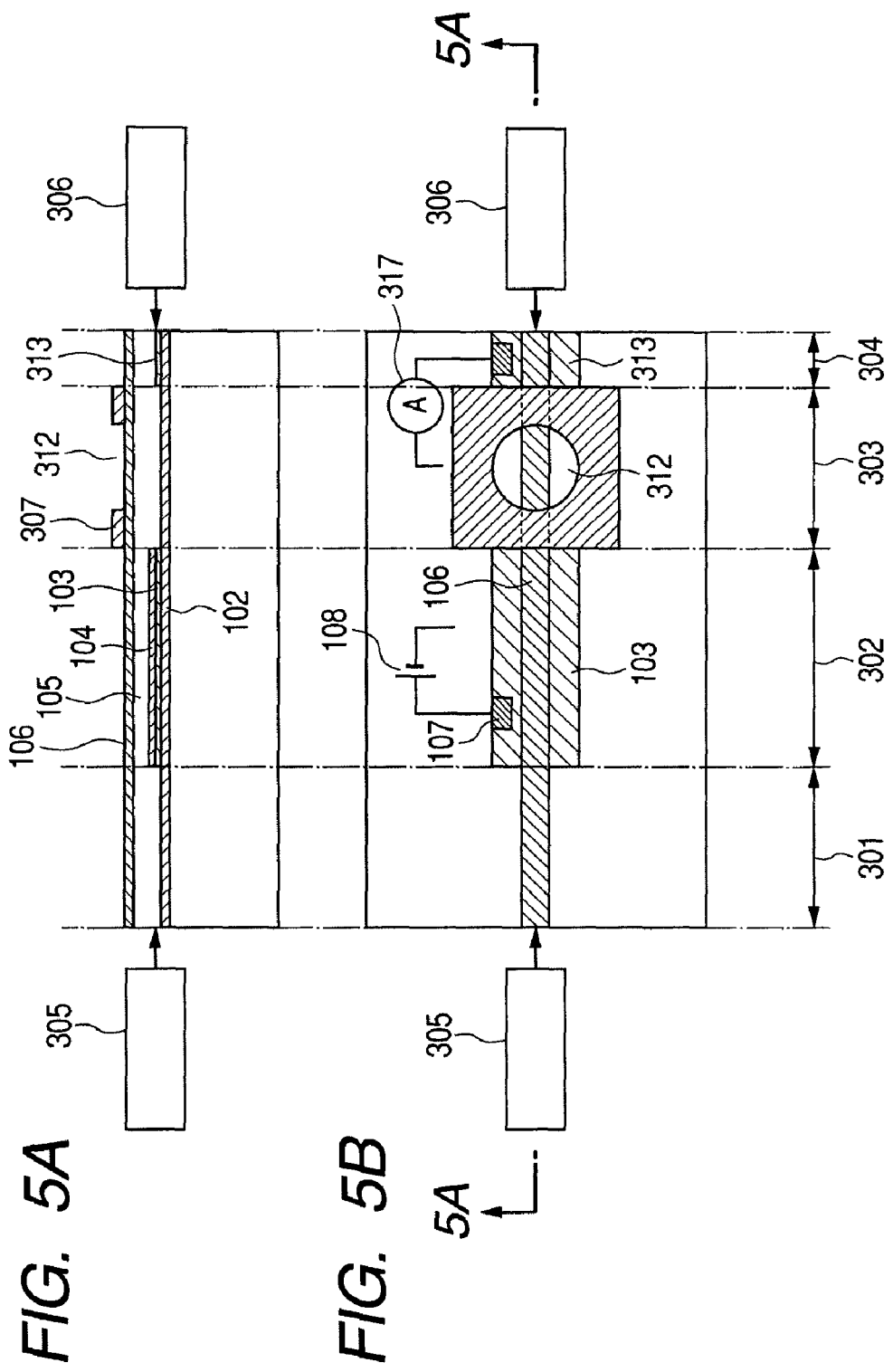

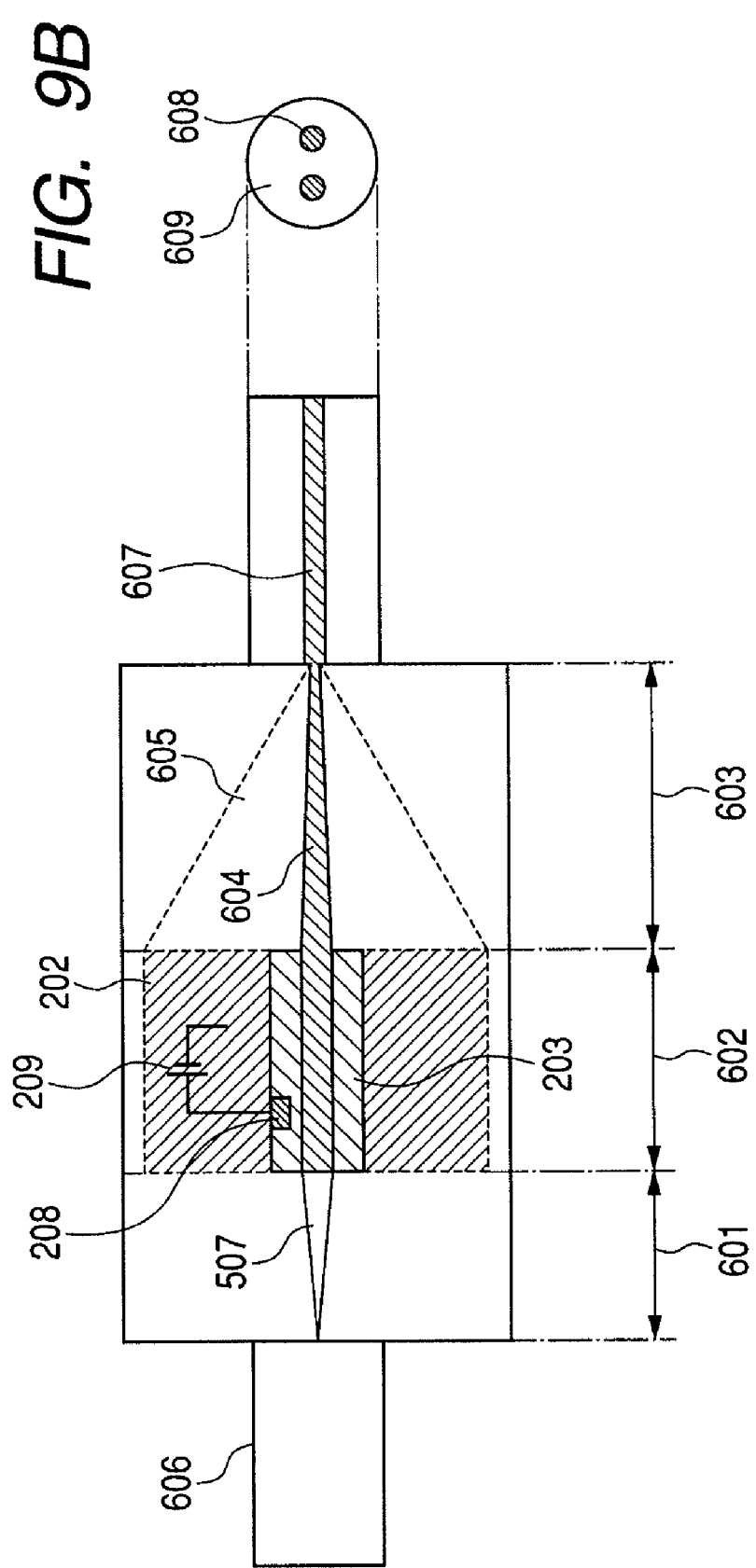

TERAHERTZ WAVE GENERATOR

BACKGROUND OF THE INVENTION

1. Field of the Invention

The present invention relates to a generation device for generating a terahertz wave (electromagnetic wave having a frequency within a range of 0.3 THz to 30 THz in this specification).

2. Description of the Related Art

The terahertz wave (electromagnetic wave having a frequency within a range of 0.3 THz to 30 THz in this specification) has its characteristics mainly as follows.

First, the wavelength is relatively short, and hence like an X-ray the terahertz wave can pass through a nonmetal substance. In addition, there are a lot of biomoleculars and drugs having an absorption spectrum specific to the frequency band of the terahertz wave. Moreover, a pulse width in the time domain is relatively short, and hence the terahertz wave has a spatial resolution that is suitable for a variety of imaging.

As applications of the terahertz wave utilizing the above-mentioned characteristics, there are spectral analysis technique for the interior of a substance, a transillumination imaging device as a safe substitute for an X-ray device, a nondestructive tomographic image acquisition technique for a lamellar structure, and the like.

Here, a source of wave for generating a terahertz wave (a terahertz wave generation apparatus that is constituted to include a light source such as a femto-second laser and a generation device such as a photoconductive antenna) can be classified into two types.

One of the types is a source of wave for generating a terahertz wave having a single color (single wavelength), including one generating a continuous wave (CW) and others generating a pulse wave. Here, the continuous wave is generated by combining two light beams having different frequencies so as to generate beating, which is supplied to the photoconductive antenna.

The other type is a source of wave for generating a monocycle terahertz pulse (having a single peak) containing wide band frequency components in which the light beams having different wavelengths are superimposed with each other keeping the phase relationship (in the state of the matched peak position).

Conventionally, as a device for generating a terahertz pulse, a photoconductive antenna including a pair of antenna type electrodes formed in a photoconductive semiconductor is suitably used.

First, femto-second laser pulse light is irradiated between electrodes to which a voltage is applied, and hence carriers are generated in a semiconductor. Next, the generated carriers are accelerated in the direction of the electric field (direction of the applied voltage). Then, a terahertz pulse having intensity corresponding to the acceleration of the carriers is generated and is radiated to the free space.

Such a photoconductive device is constituted of a semiconductor having high speed and high withstand voltage characteristics, such as GaAs (LT-GaAs) that is grown on a GaAs substrate at a low temperature.

In addition, a terahertz pulse generation device having a different form from the photoconductive antenna is disclosed in Applied Physics Letters, vol. 59, pp. 3357-3359, 1991. This device uses a silicon p-i-n diode.

Here, a film thickness of an intrinsic layer (an insulation layer or an i-layer that generates carriers when being irradiated with excitation light) of the device described above is adapted to be a thickness such that the excitation light can be sufficiently attenuated. Thus, almost all of the carriers excited by the excitation light can contribute to generation of the terahertz wave, and hence relatively high efficiency of generating the terahertz wave can be obtained.

In addition, a voltage is applied to the surface irradiated with the excitation light in a direction perpendicular to the surface (in a direction of the film thickness). In this case, if the film thickness is thin, high electric field can be applied efficiently compared with the conventional photoconductive antenna in which the voltage is applied in a direction along the surface of the film.

The device disclosed in the above-mentioned Applied Physics Letters, vol. 59, pp. 3357-3359, 1991 is configured so that the excitation light enters the surface of the diode. On the other hand, Microwave Photonics, 2003. MWP 2003 Proceedings. International Topical Meeting on, pp. 179-182, 2003 discloses a terahertz wave generator in which the excitation light enters a multilayer film structure of an InAlAs/InGaAs/InGaAsP p-i-n diode from an end surface of the device in a direction parallel to the film.

The structure of this device is aimed to generate beating by photomixing (heterodyne detecting) of two light beams having different wavelengths so that a single color terahertz wave can be generated efficiently. When the excitation light propagates in a waveguide structure having the InGaAs/InGaAsP layer (intrinsic layer or i-layer) as a core (layer for propagating excitation light), carriers are generated.

As to such waveguide type diode, a length of the intrinsic layer that can absorb the excitation light (absorption length) and the film thickness of the intrinsic layer (i-layer) can be designed independently of each other. Here, the absorption length is a parameter that contributes to the efficiency of generating the terahertz wave. The absorption length in case of the above-mentioned waveguide structure becomes a length in the direction parallel to the film from the incident end of the excitation light. In addition, the film thickness of the intrinsic layer can change an operating speed of the device. By decreasing the film thickness, the speed may be increased.

In addition, the generated terahertz wave propagates inside the waveguide structure, and hence it is easy not only to radiate into a free space but also to be connected to a transmission line.

However, in the photoconductive antenna disclosed in the above-mentioned Applied Physics Letters, vol. 59, pp. 3357-3359, 1991, energy of the light reflected by the surface for receiving the excitation light (intrinsic layer or i-layer) does not contribute to the generation of the terahertz wave, and hence an energy loss occurs.

In addition, if the terahertz wave having a higher power should be generated, it is required to increase the voltage to be applied and intensity (power) of the excitation light. In this case, a screening effect restricts the power of the generated terahertz wave.

Here, the screening effect means the following phenomenon that occurs when the photoconductive semiconductor is irradiated with the excitation light. That is the phenomenon that power of the generated terahertz wave is saturated as a power of the excitation light per unit area to be irradiated increases.

In addition, a case is considered in which the waveguide type diode disclosed in Microwave Photonics, 2003. MWP 2003 Proceedings. International Topical Meeting on, pp. 179-182, 2003 is applied to the device for generating the terahertz pulse. In this case, if the terahertz wave having a higher power should be generated, it is required to increase the voltage to be applied and the intensity (power) of the excitation light. The absorption layer (intrinsic layer or i-layer) and the core (layer for propagating excitation light) are formed as the same layer, and hence it is necessary to condense the excitation light when the excitation light enters the core. For this reason, the power of the generated terahertz wave is restricted by the above-mentioned screening effect.

In addition, the layer for generating the carriers (absorption layer) and the layer for propagating the excitation light (core) are formed as the same layer, and hence the propagation of the excitation light is restricted by transmittance of the absorption layer. Thus, the efficiency of propagation is restricted.

SUMMARY OF THE INVENTION

A terahertz wave generator for generating a terahertz wave according to the present invention includes a generating layer for generating carriers by incident excitation light, in which the excitation light reflected by the generating layer reenters the generating layer.

According to the present invention, it is possible to provide the terahertz wave generator that can improve the efficiency of generating the terahertz wave.

Further features of the present invention will become apparent from the following description of exemplary embodiments with reference to the attached drawings.

BRIEF DESCRIPTION OF THE DRAWINGS

FIGS. 5A and 5B are general structural diagrams of a transmission line integrated sensor module according to Example 2.

FIGS. 9A and 9B are general structural diagrams of a transmission medium connector according to Example 5.

DESCRIPTION OF THE EMBODIMENTS

First Embodiment

Excitation Light Reentering Generating Layer

Figure 1A:
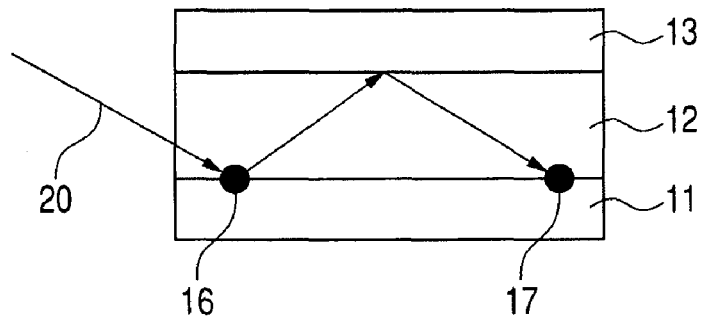
FIGS. 1A, 1B, 1C, 1D and 1E are schematic diagrams illustrating a terahertz wave generator according to an embodiment of the present invention.

A terahertz wave generator for generating a terahertz wave according to this embodiment is described with reference to FIG. 1A. Note that FIG. 1A is a cross sectional view that schematically illustrates a cross section of the device cut in the direction perpendicular to the propagation direction of the terahertz wave. Here, the terahertz wave generator according to the present invention is not limited to this structure.

The terahertz wave generator according to this embodiment has the following structure. First, a generating layer 11 is a layer for generating carriers responding to incident excitation light 20. As for the generating layer 11, it is preferred to use a structure of a semiconductor (single layer structure) having a band gap energy smaller than energy of the excitation light 20 or a diode structure (structure of multiple layers) including the semiconductor. In addition, a semiconductor superlattice or a superconductor may be used for the generating layer 11. Specifically, the structure is described in detail in (a-1) of a second embodiment. Moreover, it is preferred that a film thickness of the generating layer 11 should be 2 μm or larger. If the film thickness is that value, the excitation light 20 does not pass through the generating layer 11. Therefore, it is possible to reflect the excitation light 20 without a loss due to passing through.

Further, the terahertz wave generator according to this embodiment has a structure in which the excitation light 20 reflected by the generating layer 11 enters the generating layer again.

Thus, the excitation light can enter the generating layer multiple times by one time of irradiation with excitation light, and hence carriers can be generated efficiently. In addition, because of the increased efficiency of generating the carriers, limitation in the efficiency of generating the terahertz wave due to a screening effect can be improved.

Here, the terahertz wave generator according to this embodiment is categorized into two types (a) and (b) described below, by the position at which the reflected excitation light 20 reenters the generating layer 11.

Note that at least one of multiple "light beams (beams perpendicular to a wavefront)" included in light irradiating the generating layer 11 is referred to as "excitation light" in this specification. However, it should not be interpreted to exclude other concept than the above-mentioned concept from the present invention by the above-mentioned definition.

(a) Reflected Excitation Light Reenters the Generating Layer at a Different Position.

The excitation light 20 that has entered the generating layer 11 at a first position 16 is reflected. Then, the reflected excitation light enters the generating layer 11 at a second position 17 that is different from the first position 16.

Here, in order to configure the terahertz wave generator to have the above-mentioned function, it is preferred to structure the same as follows.

First, the terahertz wave generator is structured to have a waveguide layer 12 that permits the excitation light 20 to pass through. It is preferred to use an organic dielectric material (such as plastic) or an inorganic dielectric material (such as alumina or quartz) for the waveguide layer 12. Specifically, it is described in detail in (b-1) of the second embodiment.

Next, the terahertz wave generator is structured to have a first confinement layer 13 for enabling the light reflected by the generating layer 11 at the first position 16 to enter the second position 17. It is preferred to use for the first confinement layer 13 a material (surface reflection type) having a large imaginary part of a complex refractive index (that contributes to an energy loss) in the frequency band of the excitation light 20. Specifically, a metal or a heavily doped semiconductor can be used. In addition, it is preferred to use for the first confinement layer 13 a material having a refractive index (the real part of a complex refractive index) in the frequency band of the excitation light 20 that is smaller than that of the waveguide layer 12. In this case, it is preferred to adapt an incident angle of the excitation light 20 with respect to the first confinement layer 13 to be the angle of total internal reflection or larger (total internal reflection type).

Then, the generating layer 11, the waveguide layer 12, and the first confinement layer 13 are laminated in this order.

Note that materials and the like of the generating layer 11, the waveguide layer 12, and the first confinement layer 13 is described in detail in the second embodiment.

Here, it is preferred to irradiate the waveguide layer 12 with the excitation light 20 as illustrated in FIG. 1A. In this case, the excitation light 20 enters the end of the device in the direction along the surface of the film (in the direction perpendicular to the film thickness direction).

Alternatively, the waveguide layer 12 may be irradiated with the excitation light from the side of the first confinement layer 13. In this case, for example, it is considered to form a window in the first confinement layer 13. The window is made of a material permitting the excitation light 20 to pass through, thereby enabling the excitation light to enter the generating layer. In addition, it is preferred to use for the first confinement layer 13 a half mirror (having a transmittance of 50% for the excitation light 20 and a reflectance of 50% for the excitation light 20). However, it is needless to say that a material having a reflectance other than 100% or a transmittance other than 100% can be used for the first confinement layer 13.

It is preferred to irradiate the waveguide layer with the excitation light because no loss is generated when the excitation light passes through the first confinement layer 13, but the present invention is not limited to this structure as a matter.

(b) Reflected Excitation Light Reenters the Generating Layer at the Same Position.

Figure 1B:
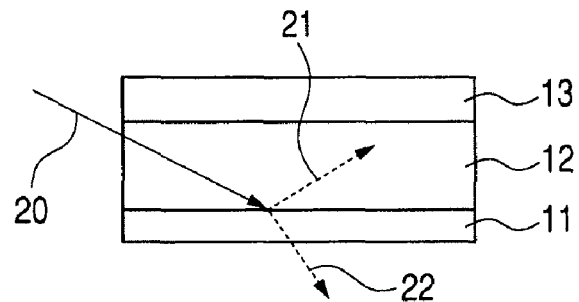
Figure 1C:
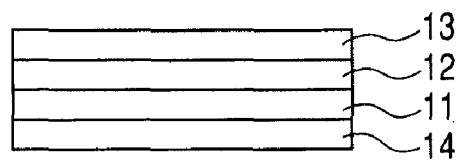

The case where the reflected excitation light reenters the generating layer 11 at the same position is described with reference to FIG. 1E. FIG. 1E is a cross sectional view illustrating schematically a cross section of the device cut in the direction perpendicular to the propagation direction of the terahertz wave.

In the device of this embodiment, first, excitation light 23 entering the generating layer 11 is reflected. Then, the reflected excitation light enters the generating layer 11 at the same position.

Here, in order to configure the terahertz wave generator to have the above-mentioned function, it is preferred to structure the same as follows.

First, the terahertz wave generator is structured to have the waveguide layer 12 that permits the excitation light 23 to pass through. Specifically, the same material as described above in (a) is used.

Next, the terahertz wave generator is structured to have a first confinement layer 13 for permitting the excitation light 23 to pass through and for reflecting the excitation light that has been reflected by the generating, layer 11. It is preferred to use a half mirror for the first confinement layer 13 as described above in (a).

Then, the generating layer 11, the waveguide layer 12, and the first confinement layer 13 are laminated in this order.

In this case, it is preferred to dispose electrodes 24 at both ends of the device for applying an electric field to the generating layer 11. Here, carriers that are generated when the excitation light 23 enters the generating layer 11 flow in the direction of applying the electric field. In addition, it is preferred that the excitation light 23 should enter the generating layer 11 in the perpendicular direction. This is because that the incident direction of the excitation light 23 may be perpendicular to the direction applying the electric field. Thus, the carriers can be accelerated in the direction of the electric field so as to generate the terahertz wave.

Note that the terahertz wave is generated as a pulse train (in the state where the terahertz wave pulses are generated at irradiation timings in sequence).

Second Embodiment

Excitation Light and Terahertz Wave Propagating in the Waveguide Layer

A terahertz wave generator for generating a terahertz wave according to this embodiment is described with reference to FIGS. 1B, 1C, and 1D. Note that FIG. 10 is a cross sectional view that schematically illustrates a cross section of the device cut in the direction perpendicular to the propagation direction of the terahertz wave. In addition, FIG. 1B is a cross sectional view illustrating schematically a cross section of the device cut in the propagation direction of the terahertz wave.

Here, the terahertz wave generator according to this embodiment has a structure in which not only the excitation light but also the terahertz wave propagates in the waveguide layer. Thus, efficiency of not only the carrier generation but also extraction of the terahertz wave can be improved.

The terahertz wave generator according to this embodiment has the following structure.

(a) Generating Layer

First, a generating layer 11 is a layer for generating carriers responding to incident excitation light 20. The generating layer 11 is formed of a photoconductive semiconductor.

(a-1) Materials

It is preferred that the generating layer 11 should be a photoconductive semiconductor (single layer structure) of GaAs (LT-GaAs), InGaAs, AlGaAs or the like that is grown at a low temperature. In addition, it is preferred that the generating layer 11 should be a structure including the photoconductive semiconductor (structure of multiple layers). The structure means a diode structure (that is a structure having rectifying property) including a semiconductor having a band gap energy smaller than photon energy of the excitation light. For instance, it is possible to use a p-i-n diode structure, a metal-i-n diode structure, a metal-i-metal diode structure, a Schottky barrier diode structure or the like. Those structures can decrease the current that flows by the carriers generated by applying a reverse bias to the device when being irradiated with the excitation light. Therefore, even if the generating layer 11 has a small resistance, the electric field can be applied efficiently to the carriers. Here, it is preferred that the material of the i-layer should be, for example, InGaAs or the like having a lower resistance than LT-GaAs, but the present invention is not limited to this structure.

(a-2) Excitation Light

When the excitation light 20 enters the generating layer 11, the terahertz wave is generated. The excitation light 20 is a coherent (i.e., having coherence) pulse light emitted from a laser light source. In addition, it is preferred that the excitation light 20 should have a pulse width of a few femto-seconds to a few tens of femto-seconds in order to generate the terahertz wave having a wide frequency band. When the generating layer 11 is irradiated with the excitation light 20, the excitation light 20 is absorbed by the generating layer 11 so that the carriers are generated.

(a-3) Direction in which the Terahertz Wave is Generated

Here, the direction in which the terahertz wave is generated is described.

FIG. 1B illustrates that the terahertz wave generated from the generating layer 11 includes terahertz waves generated in two directions. One is a first terahertz wave 21 generated on the side of the waveguide layer 12. The other is a second terahertz wave 22 generated on the opposite side to the waveguide layer 12.

The radiation of the terahertz wave has a strong directivity and satisfies the following relationship.

$$n_{opt} \sin(\theta_{opt}) = n_{THz} \sin(\theta_{THz}) \qquad \text{<Equation 1>}$$

Here, $n_{opt}$ and $n_{THz}$ respectively denote a refractive index of the excitation light 20 and a refractive index of the waveguide layer 12 at the frequency of the generated terahertz wave. In addition, $\theta_{opt}$ and $\theta_{THz}$ respectively denote an incident angle of the excitation light 20 and an angle between the center axis of the generated terahertz wave beam and the normal to the generating layer 11.

Therefore, if there is no substantial difference between $n_{opt}$ and $n_{THz}$, propagation of the wavefront of the excitation light is the same as propagation of the wavefront of the terahertz wave. Therefore, the terahertz wave is radiated substantially coaxially with the reflection light of the excitation light 20 reflected by the generating layer 11 (first terahertz wave 21). Then, the radiated terahertz wave is enclosed in the waveguide layer 12 and propagates in the same direction as the excitation light 20.

In addition, the terahertz wave propagates also in the direction in which the excitation light 20 propagates after being refracted by the interface between the waveguide layer 12 and the generating layer 11 (second terahertz wave 22).

Here, the excitation light 20 includes a component that is absorbed by the generating layer 11 and a component that is reflected by the generating layer 11. The absorbed excitation light generates carriers, which are accelerated so that the terahertz wave is generated.

(a-4) Application of Electric Field

It is preferred to apply an electric field to the carriers. For instance, it is considered to dispose electrodes for applying the voltage to the generating layer 11. When the electric field is applied, the carrier is accelerated so that the terahertz wave is generated.

Figure 2A:
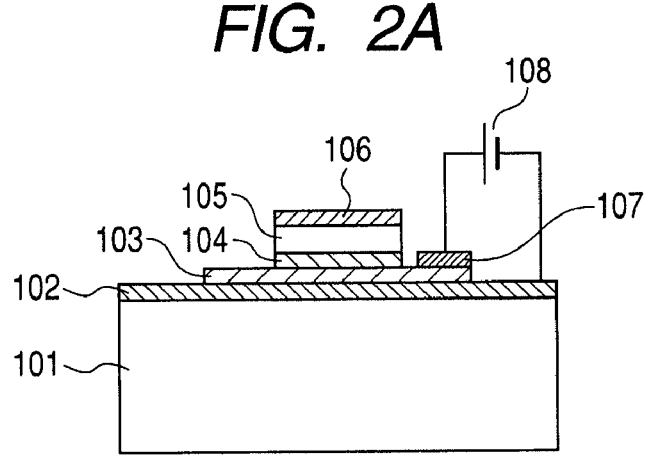
FIGS. 2A, 2B and 2C are general structural diagrams of an electromagnetic wave generator according to Example 1.

In addition, it is preferred to apply the electric field to the generating layer 11 in the film thickness direction. In this case, the electric field direction of carriers also becomes the film thickness direction (that is the same as the direction in which the electric field is applied). Therefore, when the excitation light 20 enters the end surface of the waveguide layer 12 in the horizontal direction (that is perpendicular to the film thickness direction), the excitation light 20 is reflected by the generating layer 11. In addition, the excitation light 20 reflected by the generating layer 11 is also reflected by the first confinement layer 13 as described later. The excitation light 20 repeats those reflections to propagate in the waveguide layer 12. Specifically, it is possible to adopt the structure as illustrated in FIG. 2A. Thus, a pair of electrodes are disposed on both sides of the generating layer 11, and a voltage of the reverse bias in a range that is not a breakdown voltage is applied so that a desired voltage can be applied in the direction perpendicular to the layer. As a matter of course, it is also possible to adopt another structure in which the electric field is applied in the horizontal direction with respect to the film thickness direction of the generating layer 11 as illustrated in FIG. 2C. Those structures are described in detail in Example 1.

Here, if the electric field is applied to the generating layer 11 in the film thickness direction, the propagation mode of the terahertz wave becomes the TEM mode or the TM mode.

Here, the TEM mode means a propagation state of light in which both the transverse electric (TE) mode and the transverse magnetic (TM) mode exist.

The TE mode means a propagation state in which the electric field becomes perpendicular to the propagation direction of the terahertz wave (that is perpendicular to the film thickness direction). In addition, the TM mode means a propagation state in which the magnetic field becomes perpendicular to the propagation direction of the terahertz wave.

(a-5) Surface Electric Field

If the semiconductor has a single layer structure, a surface electric field is applied even with no electric field. This phenomenon occurs because the energy band is bent on the surface of the semiconductor so that a gradient of energy is generated. Thus, the carriers can be accelerated without applying the electric field with the electrodes.

(b) Waveguide Layer

Next, a waveguide layer 12 is a layer for propagating the excitation light 20 entering the generating layer 11 and the terahertz wave 21 generated by the excitation light 20 entering the generating layer 11. The waveguide layer 12 is formed of a material that permits the excitation light 20 and the terahertz wave 21 to pass through.

(b-1) Material

The waveguide layer 12 may be constituted of a material having a high transparency to the excitation light and the terahertz wave. It is preferred to use an organic dielectric material or an inorganic dielectric material for the waveguide layer 12. As the organic dielectric material, there are plastics such as high density polyethylene, polymethylmethacrylate (PMMA), polycycloolefin, Teflon (registered trademark), and polyimide, for example. In addition, as the inorganic dielectric material, there are alumina, quartz, and the like. As a matter of course, the present invention is not limited to those materials.

In addition, it is possible to use a high resistance semiconductor having a band gap energy larger than the photon energy of the excitation light. Thus, the excitation light 20 can propagate without generating carriers in the waveguide layer 12. Moreover, air can be used. For instance, a hollow structure constituted of a metal or the like (air enclosed by a metal) can be used.

(b-2) Refractive Index

As to the terahertz wave generator according to this embodiment, it is preferred that the refractive index of the waveguide layer 12 with respect to the excitation light should be smaller than the refractive index of the generating layer 11 with respect to the excitation light. The material satisfying this relationship is, for example, the above-mentioned material.

Thus, when the excitation light 20 is reflected by the generating layer 11, the excitation light 20 propagates in a leak mode, and hence the carriers can be generated more efficiently than the case where the excitation light 20 propagates with the total internal reflection inside the generating layer 11.

Note that the leak mode means a state where light propagates by reflection while a part of the light is absorbed by the layer.

In this case, when the excitation light enters the waveguide layer 12, it is preferred that the excitation light should enter the end surface of the waveguide layer 12 by means of a lens for condensing the light. Thus, light can enter the waveguide layer 12 having a refractive index smaller than the refractive index of the generating layer 11.

Here, if the refractive index of the waveguide layer 12 with respect to the excitation light is larger than or equal to the refractive index of the generating layer 11 with respect to the excitation light, the total internal reflection of the excitation light 20 occurs. In this case, the excitation light 20 is slightly absorbed by the surface of the generating layer 11 so that carriers are generated.

(b-3) Mode Filter

A high order mode (propagation state of light having a large number of peaks) causes distortions of a time waveform and a spectrum waveform of the terahertz wave. In addition, the high order mode has a large incident angle with respect to the surface of the layer when the light enters the waveguide layer, and hence the reflectance of the generating layer is decreased and a large energy loss is generated.

Therefore, a lens having as large a focal length as possible is used, for example, and hence the excitation light is irradiated to the waveguide layer 12 with as small an angle as possible with respect to the surface of the layer. Thus, a low order mode (propagation state of light having a small number of peaks) can be oscillated.

In addition, as other means for selectively oscillating the low order mode of the excitation light, it is considered to add a device structure for extending the waveguide layer and the confinement layer to the incident end of the device. The high order mode has a larger energy loss than the low order mode has. Therefore, as the propagation distance becomes longer, the high order mode can vanish more easily.

Moreover, if the excitation light is condensed by the lens, a size of the focal spot becomes smaller in the low order mode than in the high order mode. Therefore, if a slit corresponding to the size of the focal spot is disposed at the focal position, the low order mode can be selected.

(b-4) Film Thickness

The film thickness T of the waveguide layer 12 is an important design factor for deciding the time waveform and the spectrum characteristics of the output terahertz wave.

In order to suppress a distortion of the waveform caused by interference between the multiple modes, it is preferred to propagate the terahertz wave in the single mode. This can be realized by selecting the film thickness T of the waveguide layer 12 so that the basic mode of the propagating terahertz wave is the TEM mode and that the relationship $T \leq Jc/2f_{max}\text{-}n_{THz}$ is satisfied. Here, $f_{max}$ denotes the maximum value of the frequency component of the generated terahertz wave, and c denotes the speed of light.

(c) First Confinement Layer

In addition, a first confinement layer 13 is a layer for confining in the waveguide layer 12 the excitation light 20 propagating in the waveguide layer 12 and the terahertz wave 21 propagating in the waveguide layer 12. The first confinement layer 13 is formed of a material for reflecting the excitation light 20 and the terahertz wave 21. A metal, for example, can be used for the first confinement layer 13. It is known that a metal can reflect the terahertz wave with a small energy loss.

(c-1) Material

It is desirable that the first confinement layer should be constituted of a material having a high reflectance with respect to the terahertz wave.

The reflection structure for obtaining a high reflectance includes two types. One is the surface reflection type using reflection by a material having a large effective imaginary part of the complex refractive index, and the other is the total internal reflection type using the total internal reflection. In a case of the surface reflection type, the first confinement layer 13 is constituted of a metal or a semiconductor in which impurity is doped at high density. In this case, the confinement layer can also work as the electrode for applying the voltage to the generating layer. In addition, it is possible to use a periodic structure constituted of a dielectric multilayer film or a photonic crystal. In addition, as to the total internal reflection type, it is preferred to use a material that has a smaller refractive index than the waveguide layer and is transparent to the terahertz wave, which can be air as well.

If the first confinement layer 13 is laminated on the waveguide layer 12 for guiding the excitation light, it is preferred that the first confinement layer 13 should have a high reflectance with respect to the excitation light as well. In this case, a metal is suitable for the surface reflection type, but it is possible to coat a high reflectance film made of dielectric on the metal surface so that a higher reflectance can be obtained.

(d) Relationship Among Layers

Further, the terahertz wave generator according to this embodiment includes the generating layer 11, the waveguide layer 12, and the first confinement layer 13 formed (laminated) in this order.

Thus, the excitation light reflected by the generating layer 11 is further reflected by the first confinement layer 13 and irradiates the generating layer 11 again. Therefore, the excitation light propagates in the waveguide layer 12 by being reflected repeatedly, and hence the excitation light can be used efficiently.

In addition, when the excitation light 20 irradiates the generating layer 11, the number of irradiation can be increased, resulting in that the total power of the generated terahertz wave can be increased efficiently. Thus, if the area that is irradiated at one time is increased, it is possible to solve the problem that the efficiency of generating the terahertz wave is lowered by the screening effect.

Note that the screening effect means the phenomenon that the power of the generated terahertz wave is saturated as the power of the excitation light per unit area to be irradiated increases, as described above.

(e) Device Length

Here, the terahertz wave generator according to this embodiment may be designed to have a sufficiently large device length (length of the device in the propagation direction of the excitation light). Thus, almost all energy of the excitation light can contribute to generation of the terahertz wave, and hence the efficiency of generating the terahertz wave can be increased. In addition, the terahertz wave can be amplified also when the voltage to be applied and the energy of the excitation light that is absorbed by the generating layer in one reflection are controlled to be lows.

(f) Second Confinement Layer

In addition, FIG. 10 illustrates the terahertz wave generator according to another embodiment of the present invention, which includes a second confinement layer 14 that is structured to have a material for reflecting the second terahertz wave 22.

Further, the terahertz wave generator includes the second confinement layer 14, the generating layer 11, the waveguide layer 12, and the first confinement layer 13 formed (laminated) in this order.

Thus, the second terahertz wave 22 can be reflected by the second confinement layer 14 and can propagate in the waveguide layer 12. Therefore, the second terahertz wave 22 can be used efficiently.

(f-1) Material for Reflecting Excitation Light

In addition, the second confinement layer 14 may be formed of the material for reflecting the excitation light. Thus, even if the film thickness of the generating layer 11 is so thin that the excitation light may pass through the generating layer 11, the excitation light that has passed through can be reflected by the second confinement layer 14. Therefore, the light that has passed through the generating layer 11 can irradiate the generating layer 11 again, and hence the power of the terahertz wave that propagates in the waveguide layer 12 can be increased.

A phase change of the terahertz wave due to the reflection contributes largely to the efficiency of generating the terahertz wave. If the first confinement layer is a surface reflection type like a metal and the second confinement layer is a total internal reflection type, a phase change of substantially 180 degrees occurs on only one surface. Then, the reflected terahertz wave and the generated terahertz wave are cancelled by each other. Therefore, it is preferred to unify the reflection form of the reflected terahertz wave and the generated terahertz wave in order to amplify the terahertz wave by the waveguide layer 12.

(f-2) Optical Film Thickness of the Generating Layer

In this case, it is preferred that an optical film thickness of the generating layer 11 should be smaller than or equal to one tenth of the wavelength of the terahertz wave. Thus, the second terahertz wave 22 can be regarded as one propagating with the same phase as the phase of the first terahertz wave 21 when the second terahertz wave 22 is reflected by the second confinement layer 14. This is because that waveforms of the terahertz wave reflected by the generating layer 11 and the terahertz wave reflected by the second confinement layer 14 are both cosine waves, and hence it is considered there is little difference between the peak values thereof if the optical film thickness has the above-mentioned length.

(g) Adjustment Layer

Figure 1D:
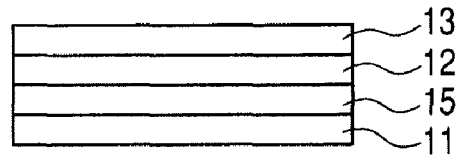
Figure 1E:
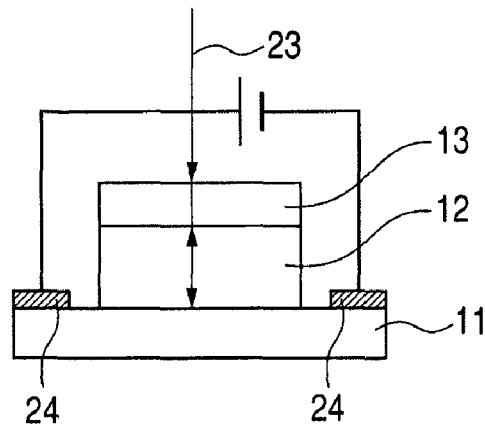

It is preferred that the terahertz wave generator according to this embodiment should include an adjustment layer 15 between the waveguide layer 12 and the generating layer 11 as illustrated in FIG. 1D. The adjustment layer is a layer for adjusting an absorption ratio (absorptance) of the excitation light absorbed by the generating layer 11. Thus, the reflectance of the excitation light at the boundary between the waveguide layer 12 and the generating layer 11 can be adjusted.

Specifically, the film thickness and the refractive index of the adjustment layer 15 are selected so that the excitation light reflected at the boundary between the waveguide layer 12 and the adjustment layer 15 is interfered with the excitation light reflected at the boundary between the adjustment layer 15 and the generating layer 11. Thus, the reflectance of the excitation light at the boundary between the waveguide layer 12 and the generating layer 11 (ratio of returning to the waveguide layer) can be adjusted, and hence a power of one time of the excitation light irradiating the generating layer 11 can be adjusted.

For instance, if the efficiency of converting the excitation light into the terahertz wave is large, the absorption amount of the excitation light absorbed by the generating layer 11 at one irradiation can be decreased so that the terahertz wave is generated by multiple times of irradiation. Thus, the above-mentioned screening effect can be prevented, and hence the terahertz wave can be generated efficiently. In addition, if the conversion efficiency is small, the film thickness or the like of the adjustment layer 15 should be selected so that the absorption amount is increased.

Here, a material of the adjustment layer 15 is selected from materials that permit the excitation light and the terahertz wave to pass through.

Note that it is preferred to structure the adjustment layer 15 to have the film thickness that decreases gradually as the distance increases from the incident end of the waveguide layer 12 for the excitation light to enter. Thus, in the region close to the incident end, the absorption amount of the excitation light can be decreased by setting the reflectance to be large, and hence the screening effect can be prevented. In addition, in the region far from the incident end, the absorption amount of the excitation light can be increased by setting the reflectance to be small, and hence the excitation light can be converted into the terahertz wave efficiently.

(h) Group Velocity Matching

Next, a device for obtaining a time waveform that is close to a monocycle (single) pulse and flat spectrum characteristic having little fringe (that is a stripe pattern generated by optical interference or the like) is described. Here, a state of wavy spectrum like one including the fringe means the state where phases of pulses as time waveforms are shifted from each other so that multiple peaks appears.

The time waveform of the monocycle pulse can be realized by matching a phase of the terahertz wave propagating in the waveguide layer with a phase of the terahertz wave that is newly generated in the generating layer when the excitation light enters. For this purpose, group velocities should be agreed between the excitation light and the terahertz wave propagating in the waveguide layer. Hereinafter, the specific structure is described.

As to the parallel-plate waveguide model, the group velocity $v_g$ of the electromagnetic wave having a frequency f is generally expressed by the following equation.

$$v_g = \frac{c}{n}\sqrt{1-\left(\frac{mc}{nfT}\right)^2} \qquad \langle \text{Equation 2} \rangle$$

Here, n and T respectively denote a refractive index and a film thickness of the waveguide layer, and c denotes the speed of light. Further, m denotes a mode order that has an integer value of 0 or larger. Considering that the frequency of the excitation light is several ten to several hundred times the frequency of the terahertz wave, the following methods may be adopted for example, in order to propagate the terahertz wave in the single mode and make the group velocities of both electromagnetic waves to agree with each other.

(h-1) Select the Low Order Mode

A first method is to match the group velocities between the TEM mode of the terahertz wave and the low order mode of the excitation light. In this case, the structure is designed so that the terahertz wave propagates in the single mode of the TEM mode while the excitation light propagates in the multimode (that is the state where light beams in various modes mix and propagate) in the film thickness T of the waveguide layer. The group velocity of the terahertz wave propagating in the TEM mode is expressed by $c/n_{THz}$ using the refractive index $n_{THz}$ of the waveguide layer with respect to the terahertz wave. On the other hand, the group velocity of a relatively low order mode among the modes of the excitation light propagating in the waveguide layer is substantially equal to $c/n_{opt}$ ($n_{opt}$ denotes the refractive index of the waveguide layer with respect to the excitation light) if the film thickness of the waveguide layer is sufficiently larger than the wavelength of the excitation light. Here, if the waveguide layer is made of a material having $n_{THz}$ and $n_{opt}$ that are regarded as equal to each other, the group velocities can be matched between the TEM mode of the terahertz wave and the low order mode of the excitation light. In order that the excitation light is oscillated selectively in the low order mode, the incident end of the device may be provided with a mode filter, for example, by extending the waveguide layer and the confinement layer.

In this way, the relatively low order mode of the excitation light propagating in the multimode is utilized, and hence the absorptance of the excitation light per unit device length is small. Therefore, this structure is effective as a generation device having high power by utilizing high intensity excitation light.

(h-2) First Waveguide Layer and Second Waveguide Layer

Another method of propagating the terahertz wave in the single mode and matching the group velocities of the both electromagnetic waves is to propagate the excitation light in the single mode and to match the group velocities between the basic mode thereof and the TEM mode of the terahertz wave.

Figure 6A:
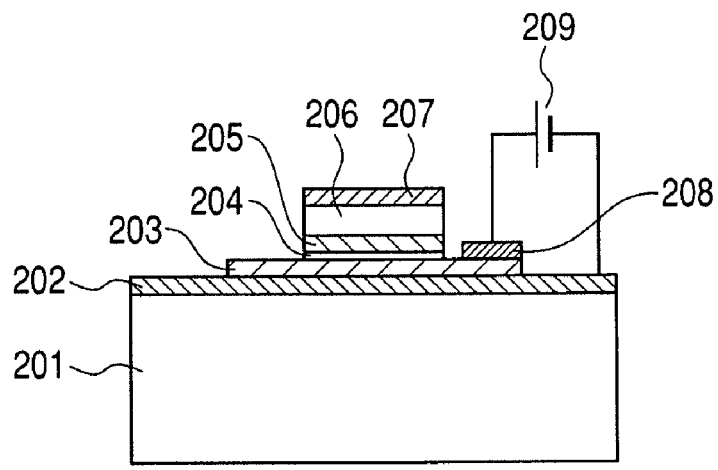
FIGS. 6A and 6B are general structural diagrams of an electromagnetic wave generator according to Example 3.

This can be realized for example as illustrated in FIG. 6A, by designing the waveguide layer 12 to have a two-layer structure including a first waveguide layer 205 for propagating the excitation light and a second waveguide layer 206 for propagating the terahertz wave. The first waveguide layer is a layer contacting with the generating layer 11 (the generating layer 203 in FIG. 6A), and the other is made the second waveguide layer.

When the excitation light is irradiated to the first waveguide layer, the excitation light can be confined in the first waveguide layer by setting the refractive index of the first waveguide layer with respect to the excitation light to be larger than the refractive index of the second waveguide layer. In addition, the film thickness of the first waveguide layer is designed optimally so that the excitation light propagates in the single mode.

The film thickness of the second waveguide layer is designed so that the terahertz wave propagates in the single mode of the TEM mode.

When the excitation light propagates in the first waveguide layer, photons are partially absorbed by the generating layer 11 so that the terahertz wave is generated. The generated terahertz wave is confined in the second waveguide layer without being affected by the first waveguide layer because the wavelength of the terahertz wave is sufficiently larger than the film thickness of the first waveguide layer.

As described above, both the electromagnetic waves including the excitation light and the terahertz wave can propagate in the single mode, and hence the group velocities thereof can be matched accurately with each other. Therefore, this structure is suitable for generating a monocycle pulse having a small pulse width.

Thus, both the excitation light and the terahertz wave can be controlled in the single mode, and hence it is easy to match the group velocity of the excitation light with the group velocity of the terahertz wave. Therefore, the terahertz wave having a small pulse width can be generated.

(i) Others (i-1) Antenna Portion

It is preferred that the terahertz wave generator according to this embodiment includes an antenna portion for radiating the terahertz wave that has propagated in the waveguide layer 12 into a free space.

Thus, an impedance of the terahertz wave generator can be matched with an impedance of the free space, and hence the generated terahertz wave can be radiated efficiently into the free space. In addition, noises generated by the reflection wave of the terahertz wave can be reduced.

(i-2) Transmission Line Integrated Sensor Module

A sensor device using the above-mentioned terahertz wave generator according to this embodiment as a generation source of the terahertz wave is described.

A change of the above-mentioned propagation state of the terahertz wave due to an object disposed in the path for the terahertz wave to propagate is detected by a detecting portion, and hence information on a form of the object is obtained.

Thus, because of the high power of the electromagnetic wave generator, it is possible to realize measurement of a more microscopic amount of specimen, measurement of higher S/N ratio and measurement at higher speed compared with the conventional sensor device. The detail thereof is described in Example 2 and the like.

(i-3) Tomography Apparatus

A tomography apparatus using the above-mentioned terahertz wave generator according to this embodiment as a generation source of the terahertz wave is described.

A change of the propagation state of the electromagnetic wave due to an object disposed in the path for the terahertz wave to propagate is detected by a detecting portion, and hence a cross sectional structure of the object is obtained.

Thus, the terahertz wave generated by the terahertz wave generator has a large power and a small pulse width, and hence it is possible to realize measurement of higher S/N ratio, measurement at higher speed and measurement at greater depth compared with the conventional tomography apparatus. The detail thereof is described in Example 4 and the like.

EXAMPLES

Example 1

Generation Device that is Configured to Include the Adjustment Layer

An electromagnetic wave generator (or the terahertz wave generator) according to this example is described with reference to the drawings.

Figure 2B:
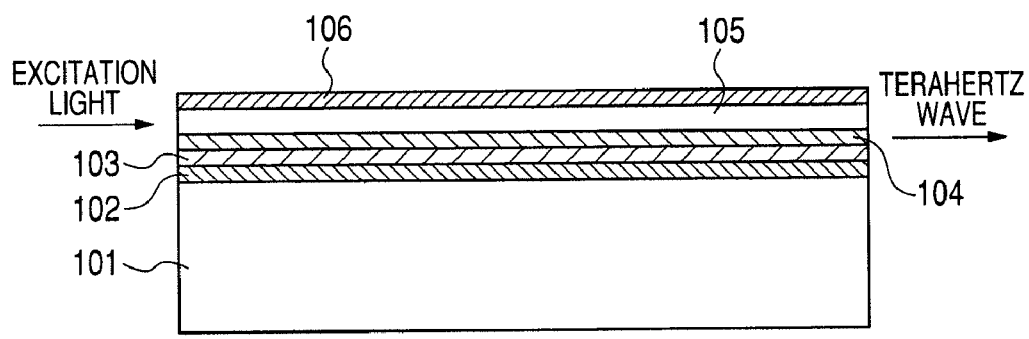
Figure 2C:
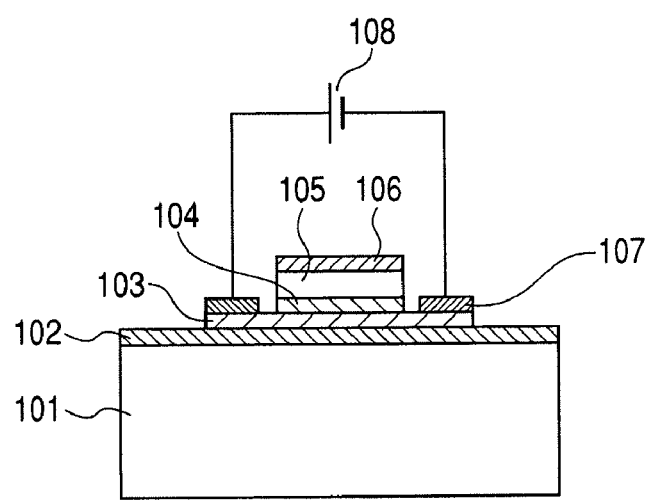

As illustrated in FIGS. 2A to 2C, the device according to this example is the electromagnetic wave generator for generating the terahertz pulse having high power from the excitation light in a frequency band corresponding to a wavelength of 1.55 μm.

On an Si substrate 101, a lower confinement layer 102 (or the second confinement layer) made of Ti/Au is formed, and in a part of the region, a generating layer 103 constituted of InGaAs/InP p-i-n diode is transferred. On the generating layer 103, an adjustment layer 104 made of $Al_2O_3$ is formed, and on the adjustment layer, a waveguide layer 105 made of benzocyclobutene (BCB) and an upper confinement layer 106 (or the first confinement layer) made of Ti/Au are formed. On a part of the upper surface of the generating layer, AuGe/Ni/Au electrode 107 for a contact is formed. Thus, via the electrode 107 and the lower confinement layer 102 that also works as an electrode, a DC voltage source 108 applies the voltage of a reverse bias to the generating layer 103. As a typical size, the entire substrate has a very small size of 1 cm×2 cm. A total film thickness of the adjustment layer 104 is 3 μm, and a distance between the confinement layers 102 and 106 is 10 μm so that the terahertz wave having a frequency of 10 THz or lower propagates only in the TEM mode. A line width of the waveguide layer is 20 μm. Note that those sizes and materials are merely examples and should not be interpreted to limit the present invention.

A manufacturing process of the device is described with reference to FIGS. 3A to 3D.

Figure 3A:
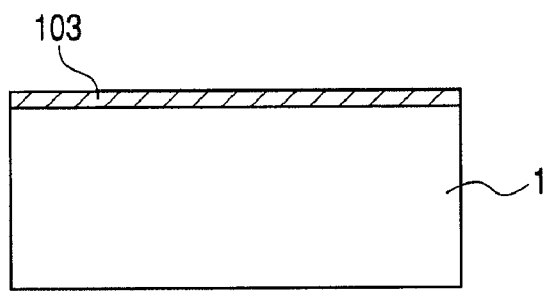
FIGS. 3A, 3B, 3C and 3D are schematic diagrams illustrating a method for manufacturing the electromagnetic wave generator according to Example 1.

As illustrated in FIG. 3A, $n^-$-InP (density of impurity is $1\times10^{16}$ cm$^{-3}$) having a thickness of 1.0 μm, $n^-$-InGaAs (density of impurity is $3\times10^{15}$ cm$^{-3}$) having a thickness of 0.5 μm, n-InP having a thickness of 0.5 μm, and $n^-$-InP (density of impurity is $1\times10^{19}$ cm$^{-3}$) having a thickness of 1.0 μm are grown on an InP substrate 1 having semi-insulating property by the MOCVD method or the like. Then, Zn is diffused, and hence a $p^+$ region (density of impurity is $5\times10^{18}$ cm$^{-3}$) is formed. Thus, the generating layer 103 constituted of the InGaAs p-i-n diode is formed.

Figure 3B:
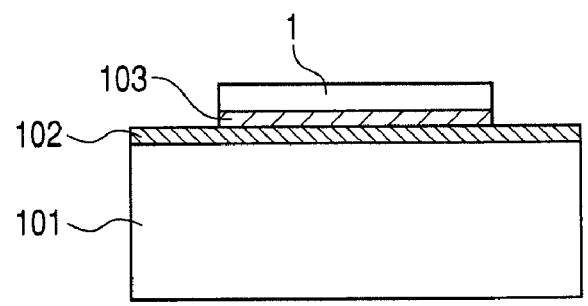

As illustrated in FIG. 3B, a Cr/AuZn/Au electrode (not shown) is formed on the surface of the generating layer, and afterward the InP substrate 1 is mechanically polished to have a film thickness of approximately 100 μm, and hence a chip of 2 cm×0.5 cm is manufactured. In advance, AuSn solder (not shown) is formed in a part region of the lower confinement layer 102 formed on the Si substrate 101, and the chip is handled and put on a desired position, and then the chip is fused by heat.

Figure 3C:
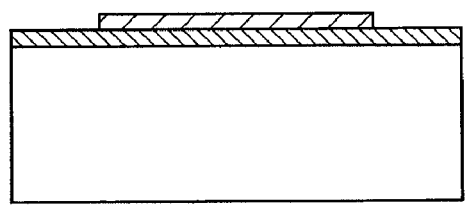

As illustrated in FIG. 3C, the InP substrate 1 is removed. In this case, the periphery of the chip is protected with an organic material or the like, and the InP substrate 1 is removed by a wet etching process.

Figure 3D:
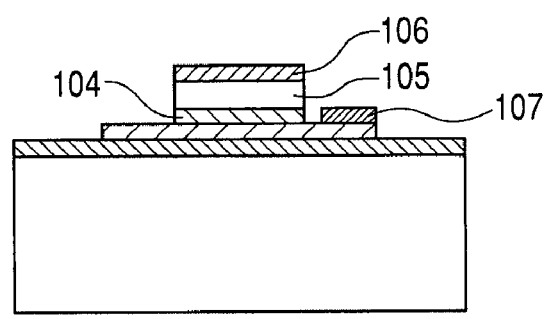

As illustrated in FIG. 3D, the adjustment layer 104, the waveguide layer 105, the upper confinement layer 106, and the electrode 107 are formed by RF sputtering, BCB coating, photo lithography, and a lift-off method.

Hereinafter, the structure and the effect of the adjustment layer 104 is described.

The fundamental structure of the electromagnetic wave generator according to this example is an asymmetric three layer slab structure including the upper confinement layer 106 and the generating layer 103 formed on both the surfaces of the waveguide layer 105. The excitation light is reflected by the boundary between the layers so as to propagate in the waveguide layer, and the reflectance can be adjusted by inserting a dielectric film in the boundary.

In the electromagnetic wave generator according to this example, the film thickness of the waveguide layer 105 is larger than the wavelength of the excitation light, and the generating layer 103 is formed on one side of the waveguide layer 105. In this case, it is considered to increase the device length for example, in order to increase the efficiency of generating the terahertz wave. Therefore, the adjustment layer 104 is inserted between the generating layer 103 and the waveguide layer 105 so as to lead the energy of the excitation light more strongly to the generating layer 103. An optimal film thickness d of the adjustment layer 104 in the relatively low order mode of the TE mode can be expressed by the following equation.

$$d = \frac{\lambda}{4\sqrt{n_t^2 - n_o^2}}$$ ⟨Equation 3⟩

Figure 4:
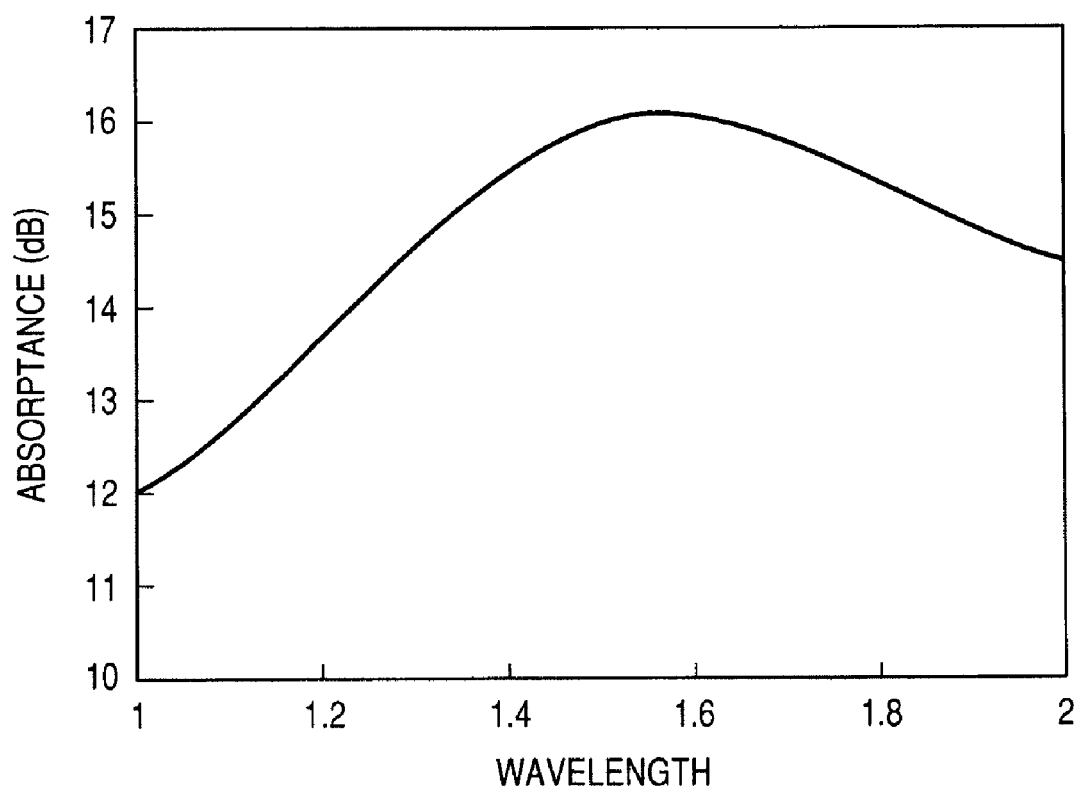
FIG. 4 is a graph illustrating absorption characteristics of excitation light in the electromagnetic wave generator according to Example 1.

Here, $n_t$ denotes a refractive index of the adjustment layer 104, $n_o$ denotes a refractive index of the waveguide layer 105, and λ denotes a center wavelength of the excitation light. If $n_t$ is 1.75, $n_o$ is 1.45, and λ is 1.55 μm, then d is equal to 0.395 μm. In this case, a relationship between the wavelength and the absorptance of the device having a device length of 2 cm is illustrated in FIG. 4. It is understood from FIG. 4 that the absorptance increases with a peak at the center wavelength of 1.55 μm of the excitation light, and that an absorptance over 16 dB is obtained at the wavelength of 1.55 μm. A loss in the upper confinement layer 106 is approximately 1.8 dB out of the absorptance of 16 dB and is sufficiently small. If the adjustment layer 104 is not inserted, the device length is required to be 8 cm in the TM mode and 50 cm in the TE mode in order to obtain the absorptance of 16 dB, which is not practical. As described above, the adjustment layer 104 plays a very important role in decreasing the device length.

In the electromagnetic wave generator according to this example, the propagation mode of the excitation light is set to be the TE mode, and the adjustment layer 104 is inserted between the waveguide layer 105 and the generating layer 103. However, this structure should not be interpreted to be a limitation as a matter of course. If the structural material or the device structure is changed, the dielectric layer that is suitable for the structure can be inserted. For instance, when the film thickness of the waveguide layer is decreased to be equal to the wavelength of the excitation light, energy of the excitation light entering the generating layer becomes so large that the generation efficiency is lowered. In this case, a high reflectance layer can be inserted in the boundary between the waveguide layer and the generating layer. In addition, it is also possible to insert a film having a film thickness varying in the longitudinal direction (e.g., having a structure in which the film thickness decrease gradually as being away from the incident end) between the generating layer and the waveguide layer so that energy of the excitation light entering the generating layer can be averaged. Moreover, it is also possible to decrease a loss in the upper confinement layer by inserting a high reflectance layer in the boundary between the waveguide layer and the upper confinement layer.

As described above, the electromagnetic wave generator according to this example includes the waveguide layer whose thickness is sufficiently larger than the excitation light wavelength, and the light receiving area of the generating layer is up to $4 \times 10^5$ μm². This is three digits larger than the photoconductive antenna having a gap width of 5 μm that is often used conventionally. Therefore, the electromagnetic wave generator according to this example is effective in particular for generating a high power terahertz wave using the excitation light having high peak power. In addition, the electromagnetic wave generator according to this example produces the terahertz wave in the TEM mode. This ensures high efficiency of connection to various transmission lines.

Example 2

Transmission Line Integrated Sensor Module

This example is a transmission line integrated sensor module using the electromagnetic wave generator according to Example 1 as illustrated in FIGS. 5A and 5B, and a transmission line integrated sensor module is an apparatus that is effective for analyzing a very small amount of biomolecular or drug. FIG. 5B illustrates a top view of the device according to this example, and FIG. 5A illustrates a cross section of the device cut along the line 5A-5A in FIG. 5B. Note that the reference numerals of a generating portion 302 correspond to those in FIG. 2A.

The transmission line integrated sensor module according to this example is constituted of four portions having different functions. That is, the transmission line integrated sensor module includes an incident connecting portion 301 that works as a mode filter for permitting only the low order mode to pass through among the propagation modes of the incident excitation light, a generating portion 302 for converting the excitation light into the terahertz wave, a sensor portion 303 for making interaction between the terahertz wave and a sample, and a detecting portion 304 for detecting a time waveform of the terahertz wave.

The incident connecting portion 301 has a structure in which the waveguide layer 105 made of BCB is sandwiched between the upper confinement layer 106 (or the first confinement layer) made of Ti/Au and the lower confinement layer 102 (or the second confinement layer). When light from an optical fiber 305 enters the waveguide layer 105, the high order mode light having a large loss is attenuated in the incident connecting portion 301 and the low order mode light is connected to the generating layer 302. In this way, the low order mode light enters the generating portion 302, and hence it is possible to suppress influences of distortions in the pulse waveform and the spectrum waveform due to the group velocity difference between the high order mode of the excitation light and the terahertz wave.

The generating portion 302 has the same structure as the electromagnetic wave generator according to Example 1.

The sensor portion 303 has a structure in which the waveguide layer 105, the upper confinement layer 106, and the lower confinement layer 102 of the generating portion 302 are extended. The terahertz wave is sent in the TEM mode. The sensor portion is protected by a protection layer 307 made of BCB having a film thickness of approximately 3 µm, and the upper confinement layer 106 is exposed only in the region of a sample holding portion 312. When a sample is placed on the sample holding portion 312, the terahertz wave that has passed through the sample holding portion 312 is modulated with physical property information of the sample and enters the detecting portion 304. With such a structure of the sample holding portion, the measurement with higher quantitative accuracy can be performed.

The detecting portion 304 has substantially the same structure as the generating portion 302. However, if carriers are generated in the optical axis direction of the terahertz wave over a long distance, a resolution of the time waveform may be deteriorated. Therefore, it is preferred to supply the probe light directly from the end surface of the device to the intrinsic layer of the p-i-n diode constituting a detection layer 313. A reflection protecting film 104 is not necessary as well on the detection side.

In the measurement described above, it is possible to use a terahertz time domain spectral method (THz-TDS) that is a known technique. That is, the excitation light is supplied from the optical fiber 305 via the incident connecting portion 301 to the generating portion 302, and hence the terahertz wave is generated. On the other hand, the probe light that is synchronous with the excitation light is supplied with an optical delay and enters the detecting portion 304 through a fiber 306. When the probe light is supplied, carriers are generated in the intrinsic layer of the detection layer 313 and are accelerated by the electric field of the terahertz wave that has propagated along the upper confinement layer 106, and are detected by an ammeter 317. The gate time of the probe light is changed by the optical delay and the measurement is repeated, and therefore the time waveform of the terahertz wave can be obtained.

As described above, the transmission line integrated sensor module according to this example can realize a high S/N ratio and a high speed of the measurement by installing a terahertz wave source having a higher power than ever before without causing a large impedance mismatch.

Example 3

Generation Device that Permits Propagation in the Single Mode

Figure 6B:
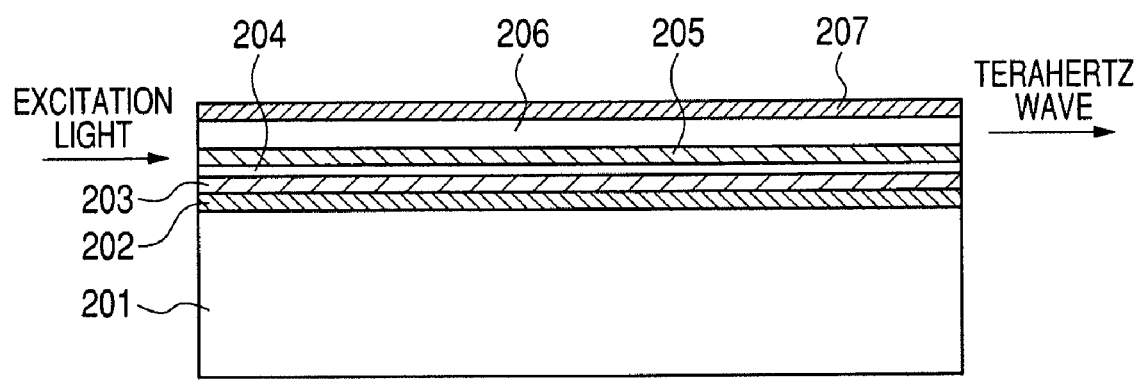

The electromagnetic wave generator according to this example illustrated in FIGS. 6A and 6B can generate a monocycle terahertz pulse that is effective for terahertz tomography measurement from the excitation light in a frequency band corresponding to a wavelength of 1.55 µm.

The electromagnetic wave generator according to this example is characterized in that the waveguide layer is divided into two regions, and the excitation light can propagate in the first waveguide layer 205 while the generated terahertz wave can propagate in the second waveguide layer 206, in the single mode respectively. Other structures of a substrate 201, a lower confinement layer 202, a generating layer 203, an adjustment layer 204, an upper confinement layer 207, an electrode 208, a voltage source 209, and the like are similar to the structure of those in the electromagnetic wave generator according to Example 1.

A refractive index $n_1$ of the first waveguide layer 205 with respect to the excitation light is selected to be larger than a refractive index $n_2$ of the second waveguide layer 206 with respect to the excitation light, and therefore total internal reflection of the excitation light occurs at the boundary between the first waveguide layer 205 and the second waveguide 206 and is confined in the first waveguide layer 205. In order to propagate the excitation light in the single mode, the film thickness of the first waveguide layer 205 should be decreased to be a value of the wavelength order. The quantity of the excitation light to be absorbed by the generating layer 203 can be adjusted by the adjustment layer 204 inserted between the generating layer 203 and the first waveguide layer 205.

The terahertz pulse of the monocycle has a wide frequency band extending from a few THz to a few tens of THz, and hence it is preferred to use the TEM mode in order to realize the single mode in all frequency regions. On the other hand, the mode of the excitation light that propagates in the first waveguide layer 205 is the $TE_0$ mode or the $TM_0$ mode, and the group velocity thereof is usually lower than the group velocity of the TEM mode. In order to match the group velocities in such constraint, for example, it is possible to use a material having a refractive index $n_{THz}$ with respect to the terahertz wave which is larger than the refractive index $n_2$ with respect to the excitation light as the material of the second waveguide layer 206. It is relatively easy to select such a material because the terahertz wave and the excitation light differ widely in frequencies.

Figure 7:
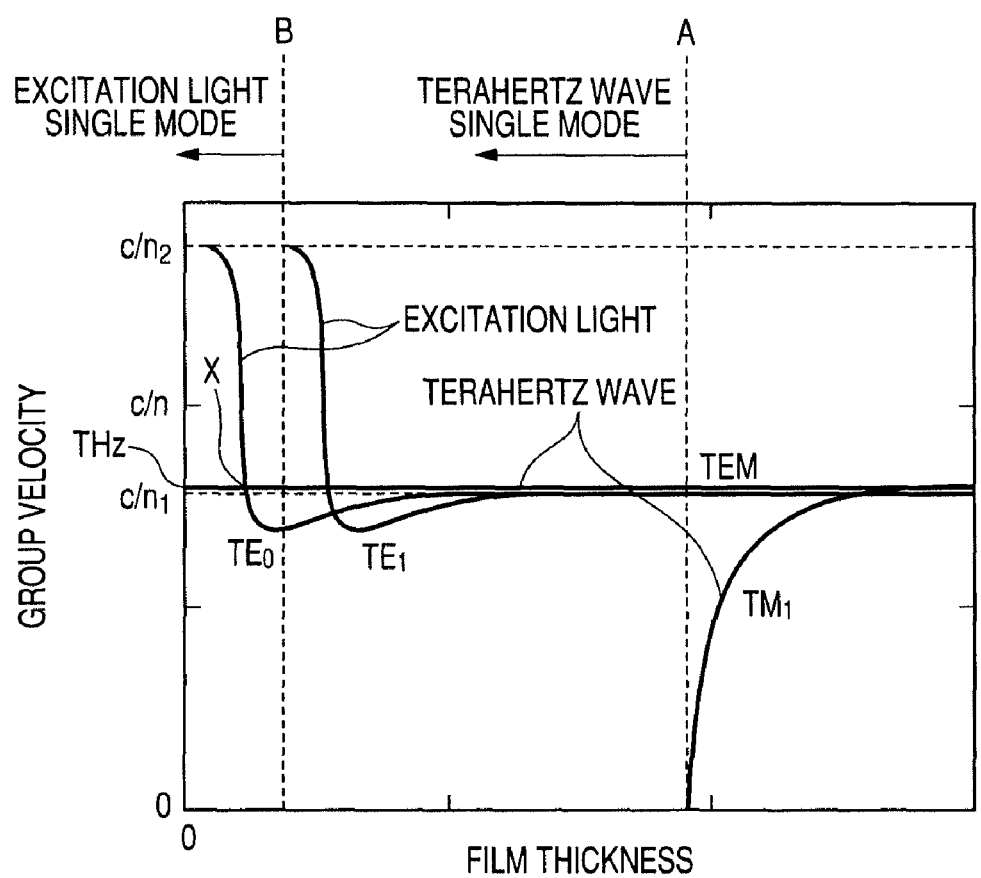
FIG. 7 is a schematic diagram illustrating group velocity matching in the electromagnetic wave generator according to Example 3.

FIG. 7 illustrates the relation of the group velocities with respect to the film thicknesses of the individual layers in the case where the first waveguide layer 205 is made of InP ($n_1$=3.167), and the second waveguide layer 206 is made of $Al_2O_3$ ($n_2$=1.746, $n_{THz}$=3.09). It is understood from the film thickness when a secondary mode is cut off that the terahertz wave propagates in the single mode in the case where the film thickness of the first waveguide layer 205 is "A" or smaller in the graph, and the excitation light propagates in the single mode in the case where the film thickness of the second waveguide layer 206 is "B" or smaller in the graph. Within the range of the film thickness to be the single mode, the group velocity of the terahertz wave that propagates in the TEM mode is a constant value $c/n_{THz}$. In contrast, the group velocity of the excitation light that propagates in the $TE_0$ mode can be a value within a range from $c/n_2$ to $c/n_1$. Therefore, if the film thickness of the first waveguide layer 205 is selected to be a value indicated by "X" in the graph, the group velocities can be matched to each other. Even if the frequency of the terahertz wave changes, the matching condition of the group velocity can be maintained over a wide frequency band because a boundary value of the film thickness indicated by "A" in the graph is shifted in the lateral direction. As typical sizes, the film thickness of the first waveguide layer 205 is 0.3 µm, and the film thickness of the second waveguide layer is 8 µm. If a $SiO_2$ (n=1.44) layer having a film thickness of 0.3 µm is inserted as the adjustment layer 204, the absorptance of the excitation light becomes 10 dB or larger in case of the device length of 500 µm.

As described above, the electromagnetic wave generator according to this example controls both the electromagnetic waves including the excitation light and the terahertz wave in the single mode and makes the group velocities of both the electromagnetic waves to match with each other, and hence it is effective for generating the monocycle pulse having a small pulse width that is used for tomography measurement or the like.

Example 4

Tomography Apparatus

Hereinafter, a terahertz tomographic imaging apparatus according to this example is described. This example is related to the tomographic imaging apparatus using the electromagnetic wave generator according to Example 3 illustrated in FIG. 8A, which is an important apparatus for industrial or medical applications such as nondestructive inspection of the interior of drugs.

Figure 8A:
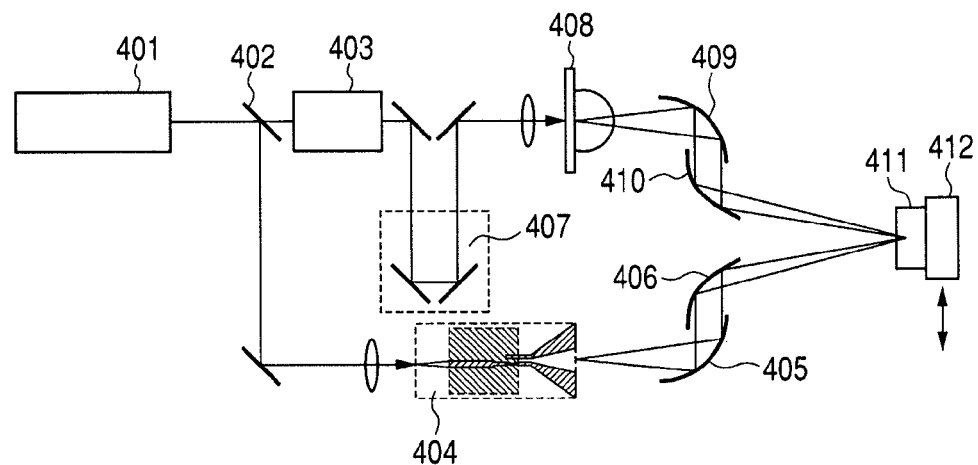
FIG. 8A is a general structural diagram of a tomographic imaging apparatus according to Example 4.

The tomographic imaging apparatus illustrated in FIG. 8A has a structure based on the terahertz time domain spectral method (THz-TDS) that is a known technique. For instance, the femto-second light pulse having a center wavelength of 1.56 µm is radiated from a femto-second pulse light source 401 constituted of a fiber laser with doped erbium and is divided into two light pulses by a beam splitter 402. One of the light pulses excites the electromagnetic wave generator 404 so as to generate the terahertz wave. On the other hand, the other of the divided light pulses is converted into the second harmonic having a center wavelength of 780 nm by a wavelength converter 403 made of, for example, a periodically poled lithium niobate (PPLN) and is provided with a time delay by an optical delay unit 407 including a combination of multiple flat reflection mirrors and a drive mirror. The light pulse with the given time delay enters the detecting portion 408 including a photoconductive antenna made of LT-GaAs.

The terahertz wave generated by the electromagnetic wave generator 404 is condensed by two parabolic mirrors 405 and 406. A specimen 411 is placed at the light condensed position. In the specimen 411, the reflected terahertz wave enters the detecting portion 408 via the two parabolic mirrors 409 and 410. In the detecting portion 408, a current signal is generated that is proportional to the amplitude of the terahertz wave at the incident time point of the light pulse.

Using the optical delay unit 407, the optical delay is changed one by one while performing the measurement, and hence a time series waveform of the terahertz wave can be obtained. The time series waveform includes information of the internal structure of the specimen 411. By analyzing the time series waveform, it is possible to obtain one-dimensional information of the specimen in a depth direction at the vicinity of the point to which the terahertz wave has been irradiated. Moreover, the specimen 411 is scanned in a direction substantially perpendicular to the optical axis by using a scanning stage 412, and hence a cross sectional image of the specimen 411 can be obtained.

As described above, the tomographic imaging apparatus according to this example is an effective apparatus for obtaining an internal structure of a specimen in a nondestructive manner. In addition, the electromagnetic wave generator 404 according to the present invention can generate the terahertz wave having a high power, and hence a measurable distance in the depth direction can be increased and the S/N ratio can be improved.

Figure 8B:
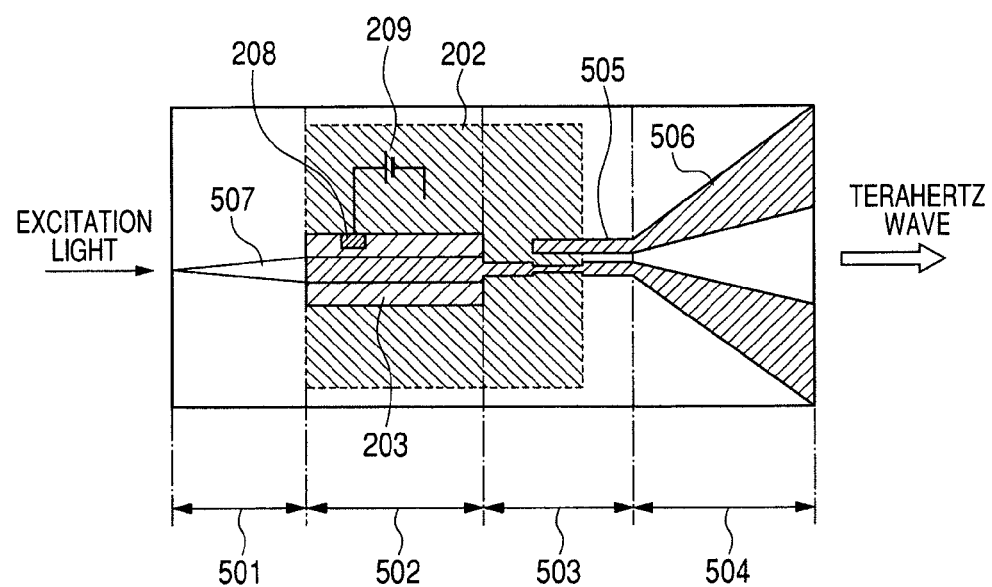
FIG. 8B is a general structural diagram of an electromagnetic wave generator according to Example 4.

FIG. 8B illustrates details of the electromagnetic wave generator 404 of this example. The electromagnetic wave generator 404 includes four portions as follows. That is, the electromagnetic wave generator 404 includes an incident connecting portion 501 for efficiently connecting the excitation light to a generating portion 502, the generating portion 502 having the same structure as the electromagnetic wave generator according to Example 3 (reference numerals of the generating portion 502 in the diagram corresponds to FIG. 6A), an impedance conversion portion 503 for preventing reflection of the terahertz wave generated by the generating portion 502 and for efficiently connecting to an antenna portion 504, and the antenna portion 504 for radiating the terahertz wave efficiently into a free space.

The incident connecting portion 501 is constituted of a dielectric waveguide structure of a core and clad structure. The first waveguide layer (denoted by 205 in FIG. 6A) of the generating portion 502 is constituted of an InP thin film having a film thickness of 0.3 µm so that the excitation light propagates in the single mode, and hence it is difficult to connect the excitation light directly with an ordinary connection system such as a lens. In this embodiment, it is devised to form a tapered waveguide 507 in which the width of the InP core formed by extending the first waveguide layer (denoted by 205 in FIG. 6A) of the generating portion 502 is decreased gradually in the direction toward the incident end surface, and hence the mode diameter on the incident end surface can be increased.

The impedance conversion portion 503 is a circuit for efficiently connecting a coplanar strip line 505 adapted to the wide frequency band and high efficiency tapered slot antenna 506 with a microstrip line type output end of the generating portion 502. Therefore, the impedance conversion portion 503 is possible to use an appropriate structure depending on the structure of the waveguide layer of the generating portion 502 and the structure of the antenna portion 504.

The device according to this example includes the antenna portion 504 using the tapered slot antenna 506 having wide frequency band and high efficiency, but this structure should not be interrupted as a limitation as a matter of course. For instance, it is possible to use a dipole, a spiral, an F type antenna, or a bow tie antenna. In addition, it is possible to integrate a three-dimensional antenna such as a horn antenna or various array antennas.

Example 5

Transmission Medium Connector

A transmission medium connector according to this example is described with reference to FIGS. 9A and 9B. This is a transmission medium connector using the electromagnetic wave generator according to Example 3. The transmission medium connector is an important apparatus for medical application of the terahertz wave such as an endoscopic surgery. A fiber connector illustrated in FIG. 9A includes, for connecting the terahertz wave to a transmission medium 607 with high efficiency, an incident connecting portion 601 for efficiently connecting the excitation light from the optical fiber 606 to the generating portion 602, and an impedance conversion portion 603 having an upper confinement layer 604 and a lower confinement layer 605 provided to the generating portion 602 having the same structure as the electromagnetic wave generator according to Example 3 (reference numerals of the generating portion 502 in the diagram correspond to FIG. 6A).

In this embodiment, the transmission medium 607 includes parallel lines constituted of two parallel metal wires 608 and a dielectric clad 609 as illustrated in FIG. 9B that is a cross section thereof, but this structure should not be interrupted as a limitation as a matter of course. For instance, it is possible to use various transmission media such as a dielectric fiber, a single line wire, a hollow waveguide, or the like.

As described above, the electromagnetic wave generator of the present invention has the output end that has the waveguide structure, and hence it can be connected to various transmission media via a simple impedance conversion portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-261747, filed Oct. 8, 2008, which is hereby incorporated by reference herein in its entirety.

What is claimed is:

1. A terahertz wave generator for generating a terahertz wave, comprising:
a generating layer for generating carriers by incident excitation light, wherein the excitation light reflected by the generating layer reenters the generating layer;
a waveguide layer for permitting the excitation light to pass through; and
a first confinement layer for making the excitation light reflected by the generating layer to reenter the generating layer,
wherein:
the generating layer, the wave guide layer, and the first confinement layer are laminated in the stated order,
the generating layer is formed of a photoconductive semiconductor,
the waveguide layer is formed of a material that permits the excitation light entering the generating layer and a terahertz wave generated by the excitation light entering the generating layer to pass through, and
the first confinement layer is formed of a material that reflects the excitation light propagating in the waveguide layer and the terahertz wave propagating in the waveguide layer.

2. A terahertz wave generator according to claim 1, wherein the excitation light that enters the generating layer at a first position is reflected, and the reflected excitation light enters the generating layer at a second position that is different from the first position.

3. A terahertz wave generator according to claim 1, further comprising a second confinement layer formed of a material that reflects the terahertz wave generated in the generating layer,
wherein the second confinement layer, the generating layer, the waveguide layer, and the first confinement layer are laminated in the stated order.

4. A terahertz wave generator according to claim 1, wherein the generating layer has an optical thickness of one tenth or smaller of a wavelength of the terahertz wave generated from the generating layer.

5. A terahertz wave generator according to claim 1, wherein the waveguide layer has a refractive index with respect to the excitation light that is smaller than a refractive index with respect to the excitation light of the generating layer.

6. A terahertz wave generator for generating a terahertz wave, comprising:
a generating layer for generating carriers by incident excitation light, wherein the excitation light reflected by the generating layer reenters the generating layer, the excitation light that enters the generating layer at a first position is reflected, and the reflected excitation light enters the generating layer at a second position that is different from the first position;
a waveguide layer for permitting the excitation light to pass through;
a first confinement layer for making the light reflected by the generating layer at the first position to enter at the second position; and
a second confinement layer formed of a material that reflects the terahertz wave generated in the generating layer,
wherein the second confinement layer, the generating layer, the waveguide layer, and the first confinement layer are laminated in the stated order, and
wherein the second confinement layer is an electrode for applying an electric field to the generating layer.

7. A terahertz wave generator according to claim 6, wherein the excitation light that enters the generating layer at a first position is reflected, and the reflected excitation light enters the generating layer at a second position that is different from the first position.

8. A terahertz wave generator according to claim 6, wherein the generating layer has an optical thickness of one tenth or smaller of a wavelength of the terahertz wave generated from the generating layer.

9. A terahertz wave generator according to claim 6, wherein the waveguide layer has a refractive index with respect to the excitation light that is smaller than a refractive index with respect to the excitation light of the generating layer.

10. A terahertz wave generator for generating a terahertz wave, comprising:
a generating layer for generating carriers by incident excitation light, wherein the excitation light reflected by the generating layer reenters the generating layer, the excitation light that enters the generating layer at a first position is reflected, and the reflected excitation light enters the generating layer at a second position that is different from the first position;
a waveguide layer for permitting the excitation light to pass through;
a first confinement layer for making the light reflected by the generating layer at the first position to enter at the second position; and
an adjustment layer for adjusting an absorption ratio of the excitation light absorbed by the generating layer,
wherein the generating layer, the adjustment layer, the waveguide layer, and the first confinement layer are laminated in the stated order.

11. A terahertz wave generator according to claim 10, wherein the excitation light that enters the generating layer at a first position is reflected, and the reflected excitation light enters the generating layer at a second position that is different from the first position.

12. A terahertz wave generator according to claim 10, further comprising a second confinement layer formed of a material that reflects the terahertz wave generated in the generating layer, wherein the second confinement layer, the generating layer, the waveguide layer, and the first confinement layer are laminated in the stated order.

13. A terahertz wave generator according to claim 10, wherein the generating layer has an optical thickness of one tenth or smaller of a wavelength of the terahertz wave generated from the generating layer.

14. A terahertz wave generator according to claim 10, wherein the waveguide layer has a refractive index with respect to the excitation light that is smaller than a refractive index with respect to the excitation light of the generating layer.

15. A terahertz wave generator for generating a terahertz wave, comprising:
   a generating layer for generating carriers by incident excitation light, wherein the excitation light reflected by the generating layer reenters the generating layer, the excitation light that enters the generating layer at a first position is reflected, and the reflected excitation light enters the generating layer at a second position that is different from the first position; and
   a waveguide layer for permitting the excitation light to pass through;
   a first confinement layer for making the light reflected by the generating layer at the first position to enter at the second position,
   wherein the generating layer, the wave guide layer, and the first confinement layer are laminated un the stated order, and
   wherein the waveguide layer includes a first waveguide layer for propagating the excitation light and a second waveguide layer for propagating the terahertz wave.

16. A terahertz wave generator according to claim 15, wherein the excitation light that enters the generating layer at a first position is reflected, and the reflected excitation light enters the generating layer at a second position that is different from the first position.

17. A terahertz wave generator according to claim 15, further comprising a second confinement layer formed of a material that reflects the terahertz wave generated in the generating layer,
   wherein the second confinement layer, the generating layer, the waveguide layer, and the first confinement layer are laminated in the stated order.

18. A terahertz wave generator according to claim 15, wherein the generating layer has an optical thickness of one tenth or smaller of a wavelength of the terahertz wave generated from the generating layer.

19. A terahertz wave generator according to claim 15, wherein the waveguide layer has a refractive index with respect to the excitation light that is smaller than a refractive index with respect to the excitation light of the generating layer.

* * * * *